(12) United States Patent  
Pant et al.

(10) Patent No.: US 8,873,083 B2  
(45) Date of Patent: Oct. 28, 2014

(54) USER CENTRIC PRINT USAGE

(75) Inventors: Lakshana Pant, Bangalore (IN);  
Donald I. Fernandes, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/528,852

(22) Filed: Jun. 21, 2012

(65) Prior Publication Data

US 2013/0346259 A1   Dec. 26, 2013

(30) Foreign Application Priority Data

Apr. 28, 2012   (IN) .......................... 1672/CHE/2012

(51) Int. Cl.
*G06K 1/00* (2006.01)
*G06Q 30/06* (2012.01)

(52) U.S. Cl.
CPC .............. *G06Q 30/0609* (2013.01); *G06K 1/00* (2013.01)
USPC ...................................... 358/1.14; 705/26.35

(58) Field of Classification Search
CPC ....... G06Q 30/00; G06Q 20/00; G06Q 50/00; G06F 3/12
USPC ........... 705/26.35, 26.1, 14.49, 10, 14; 347/7; 709/203; 713/168
See application file for complete search history.

(56) References Cited

U.S. PATENT DOCUMENTS

| 5,629,981 | A  | * | 5/1997 | Nerlikar ......................... 713/168 |
| 7,043,523 | B2 | * | 5/2006 | Haines et al. ................. 709/203 |
| 8,009,312 | B2 |   | 8/2011 | Katoh et al. |
| 8,047,626 | B1 |   | 11/2011 | Derhak et al. |
| 8,271,348 | B2 | * | 9/2012 | Rise et al. ................... 705/26.35 |
| 2005/0146745 | A1 | * | 7/2005 | Umehara ..................... 358/1.15 |
| 2006/0069615 | A1 | * | 3/2006 | Gupta ............................ 705/14 |
| 2007/0030296 | A1 | * | 2/2007 | Yoshida et al. .................... 347/7 |
| 2007/0273912 | A1 | * | 11/2007 | Maurin ....................... 358/1.14 |
| 2009/0327033 | A1 | * | 12/2009 | Rai et al. ......................... 705/10 |
| 2010/0088178 | A1 | * | 4/2010 | Gnanasambandam et al. ........................... 705/14.49 |
| 2010/0202017 | A1 |   | 8/2010 | Sano |
| 2011/0135337 | A1 |   | 6/2011 | Saito et al. |
| 2011/0188068 | A1 | * | 8/2011 | Jones et al. .................. 358/1.15 |
| 2011/0191197 | A1 | * | 8/2011 | VanWinkle et al. ......... 705/26.1 |

FOREIGN PATENT DOCUMENTS

| EP | 1172750       | * | 1/2002  | ............. G06F 17/60 |
| JP | 2002328796 A  |   | 11/2002 |                         |
| JP | 2010120341 A  |   | 6/2010  |                         |
| JP | 2004302651    | * | 10/2013 | ................ G06F 3/12 |

* cited by examiner

*Primary Examiner* — Jerome Grant, II (57) ABSTRACT

Enabling web management of print usage for a user(s) and/or printer device(s). A central management unit can interact with a plurality of accounts (e.g., prepaid accounts; and/or post-paid accounts), which are associated with users and/or printers—to predict printing activities and regulate printer supplies.

18 Claims, 9 Drawing Sheets

USER CENTRIC PRINT USAGE

RELATED APPLICATIONS

Benefit is claimed under 35 U.S.C. 119(a)-(d) to Foreign application Ser. No. 1672/CHE/2012 entitled "USER CENTRIC PRINT USAGE" by Hewlett-Packard Development Company, L.P., filed on Apr. 28, 2012, which is herein incorporated in its entirety by reference for all purposes.

BACKGROUND

In general, many factors contribute to overall costs of print activities. Moreover, an ability to reliably estimate related print costs can significantly impact efficiency and profitability for such print activities.

In this regard, primary factors that contribute to cost of a print task (e.g., at time of bidding) can include dimensions of print task, cost of printer supplies, such as ink, toner units, and the like. Typically, amount of some resources employed for a predetermined print task can be readily estimated, because information about them can be accurately determined before such print activity is performed. The dimensions of the print task, for example, can identify amount of print media that is typically required for such print activity. Hence, when generating a bid for the print task, one can readily consider cost of the media into account.

To this end, estimating a print task based on printed area can be considered a common practice, as such media can be easily measured. On the other hand, an ability to account for cost of ink, remains more challenging. For example, cost of ink is typically estimated to be a fixed cost, wherein an ability to measure volume of ink employed for a print task remains problematic for various reasons. First, because volume of an ink-drop remains unclear, and second because such volume can quickly change during print activities. Furthermore, interfacing with the printing system can also pose difficulties, as the interfaces are typically not designed to provide such type of information.

DETAILED DESCRIPTION

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In other instances, structures and devices are shown in block diagram form in order to facilitate describing one or more embodiments.

It is to be appreciated that in accordance with various aspects presented in this disclosure, users can be provided the opportunity to opt-out of having information (e.g., personal information, sensitive information, location information, etc.) collected and/or shared with servers, devices, or applications. Moreover, embodiments can anonymize data collected from respective users.

Various aspects of the subject disclosure relates to web-enabled management of print usage for a user(s), such as regulating supplies and costs associated with print activities of end user devices In one aspect, a central management unit (e.g., as part of a cloud environment) can monitor print activity of user, and customize a predetermined plan based thereon.

Figure 1:
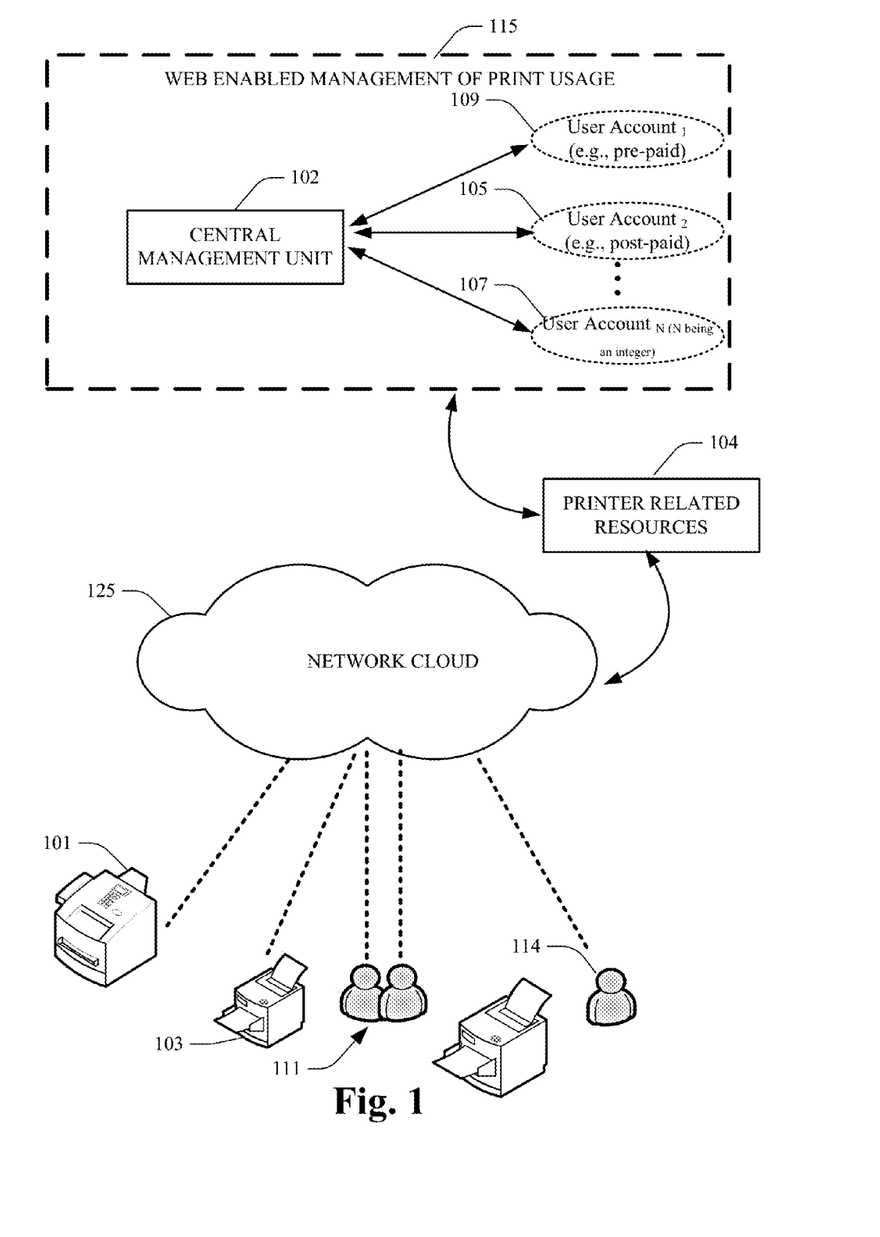
FIG. 1 illustrates an example of a block diagram for a non-limiting system that facilitates a user centric managing of print activities.

FIG. 1 illustrates a system 100 that web-enabled management of print usage for a user(s), such as regulating supplies and costs associated with print activities of end user devices 101, 103. In one aspect, the supplies associated with the print activities can include ink cartridges, refillable ink containers, printer heads, and in general any printer item that facilitates printing by end user device 101, 103 and/or user 111, 114. The system 100 includes a central management unit 102 that can concurrently service requests from several clients for managing supplies associated with user printing activities and/or end user devices 101, 103 for printing activities. The central management unit 102 can interact with a computing "cloud" environment 125 (and/or) be part thereof, which supports a collection of printer related resources 104 associated with printing.

Moreover, such printer related resources 104 can be maintained by an off-site party, and can be accessed and utilized by identified users over a network (e.g., Internet, WAN, . . . ). Even though FIG. 1 depicts the central management unit 102 as single unit, it is understood that such unit 102 can be distributed over various geographic locations. For example, the central management unit 102 can include any number of data center machines, such as data center machines that store and/or retrieve data related to printing activities users. Likewise, such data center machines (not shown) can be employed for storing/retrieving data, effectuating computational tasks, identifying end user machine and/or user printing requirement, and the like.

In one particular aspect, a third party service provider (not shown) can provide any number of services such as data storage services, computational services, word processing services, presentation services, and any other services or applications that are conventionally associated with personal computers and/or printing activities. Furthermore, employing any number of third party service providers to facilitate the web-enabled management of print usage for a user(s), are well within the realm of the subject innovation. For example, disparate third party service providers can be maintained by differing off-premise parties and a user can employ (e.g., concurrently, at different times, . . . ) all or a subset of the third party service providers.

As described in detail with respect to various additional figures below of this disclosure, the central management unit 102 can interact with a plurality of accounts 109, 105, 107 associated with a user (e.g., employing a "prepaid account" plan 109; and/or a "postpaid account" plan 105) that is set with the central management unit 102, for example. According to one particular aspect, the prepaid account 109 can include in advance payment by the user for employing print services, wherein notifications are sent to the user, based on amount and/or credit that remains in such user account and based on print activity. Likewise, and in the postpaid plan 105 the user can replenish the account after a predetermined amount of service (e.g., predetermined threshold for number of copies made and/or real-time monitoring for level of ink, and the like.) Such an arrangement 100 can further facilitate user experience related to print activities such as improving ink ordering procedures and correlating ink expenses with direct print usage (as opposed to associating print costs directly with printer cartridge.) It is to be appreciated if the account of a user becomes negative, printing activities for such user are inhibited—even though ink indeed remains available in printers associated with such user.

Figure 2:
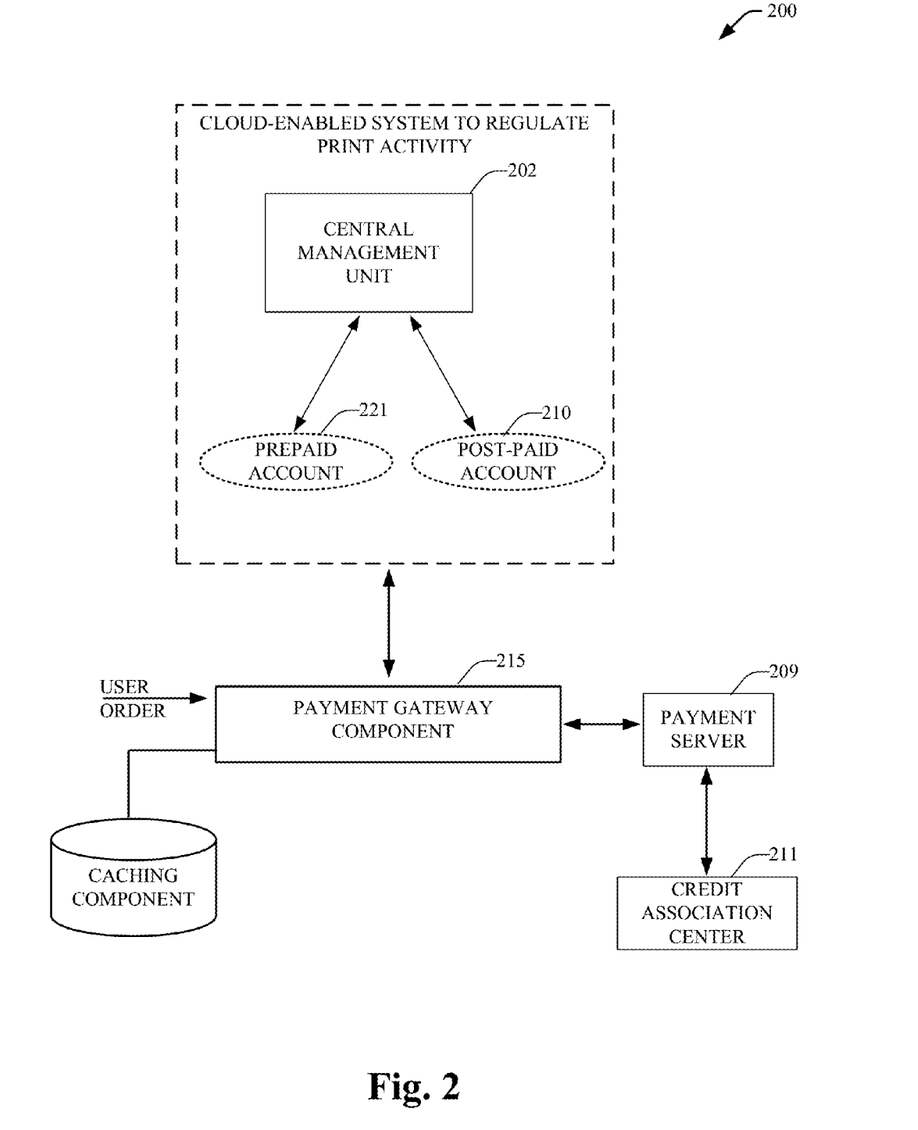
FIG. 2 illustrates an example for a central management unit that can employ a variety of user account plans, in accordance with various aspects of the subject disclosure.

FIG. 2 illustrates a cloud-enabled system 200 regulating print activities, which further includes a central management unit 202 that can employ a variety of user account plans, in accordance with various aspects of the subject disclosure. In one aspect, user print activity can be facilitated by a prepaid plan, wherein users can be charged based on a "pay-as-you-print" model, wherein credit towards a user account is purchased in advance of service use. For example, access to printing can be denied by the central management unit 202, if no credits is available (e.g., user account falls beneath a predetermined threshold.) Such can occur even though ample ink/supplies exist in a printer that is associated with such account. Likewise, users can add additional credit/funds (and at any time) by employing a plurality of payment mechanism. Such payment mechanism can include: credit cards, direct withdrawals, electronic reloading via subscriber identifications, and the like.

In a related aspect, credit purchases for such prepaid model can have a time limit (e.g., 180 days) from the date a credit is added, wherein a deletion rule can then be applied to unused items, for example. Such prepaid printing plan can enable users to regulate their printing behavior based on purchased amount. Moreover, such "all or nothing" preposition for the payment model can further be customized to enable customers carry a negative balance that is deducted when the customer next adds additional credit.

In a related aspect, the central management unit 202 can employ a postpaid account plan 210 for printing needs of a user, wherein the client can be charged during a predetermined period, and hence does not feature any limitations on volume of service used. Such can be deemed a contrast to the prepaid plan 221 described above, which requested customers to add credit to their accounts prior to usage (wherein their usage is typically limited to the amount being added to the account.)

All such user account plans can be implemented via the payment gateway component 215, which can represent an e-commerce application service provider service that authorizes payments for ink requirements of a user and/or end user device. For example, the payment gateway component 215 can be deemed equivalent to a physical point of sale terminal that is located in brick and mortar retail outlets. Such payment gateway component 215 can protect credit card details by encrypting sensitive information (e.g., as payment data) to ensure that information is passed securely between the customer and the central management unit and also between the central management unit 202 and the payment processor.

For example, a user can place an order for a pre-paid account (or alternatively submit payment for a post-paid account) by submitting a submit order, or an equivalent button, or submitting credit card details via an automatic phone answering service. In one aspect, the customer's web browser encrypts information to be sent between the browser and the central management unit, (e.g., via Secure Socket Layer-SSL encryption.) Subsequently, the payment gateway component 215 can employ another SSL encrypted connection for interaction with a payment server 209, which can be associated with a card association center 211, and/or issuing bank The credit association center 211 or issuing bank can receive an authorization request and sends a response back to the payment server or payment processor associated therewith, such as with a response code, which determines declining or accepting the payment. If accepted, the acquiring bank can deposit approved funds in an bank nominated by the central management unit.

Figure 3:
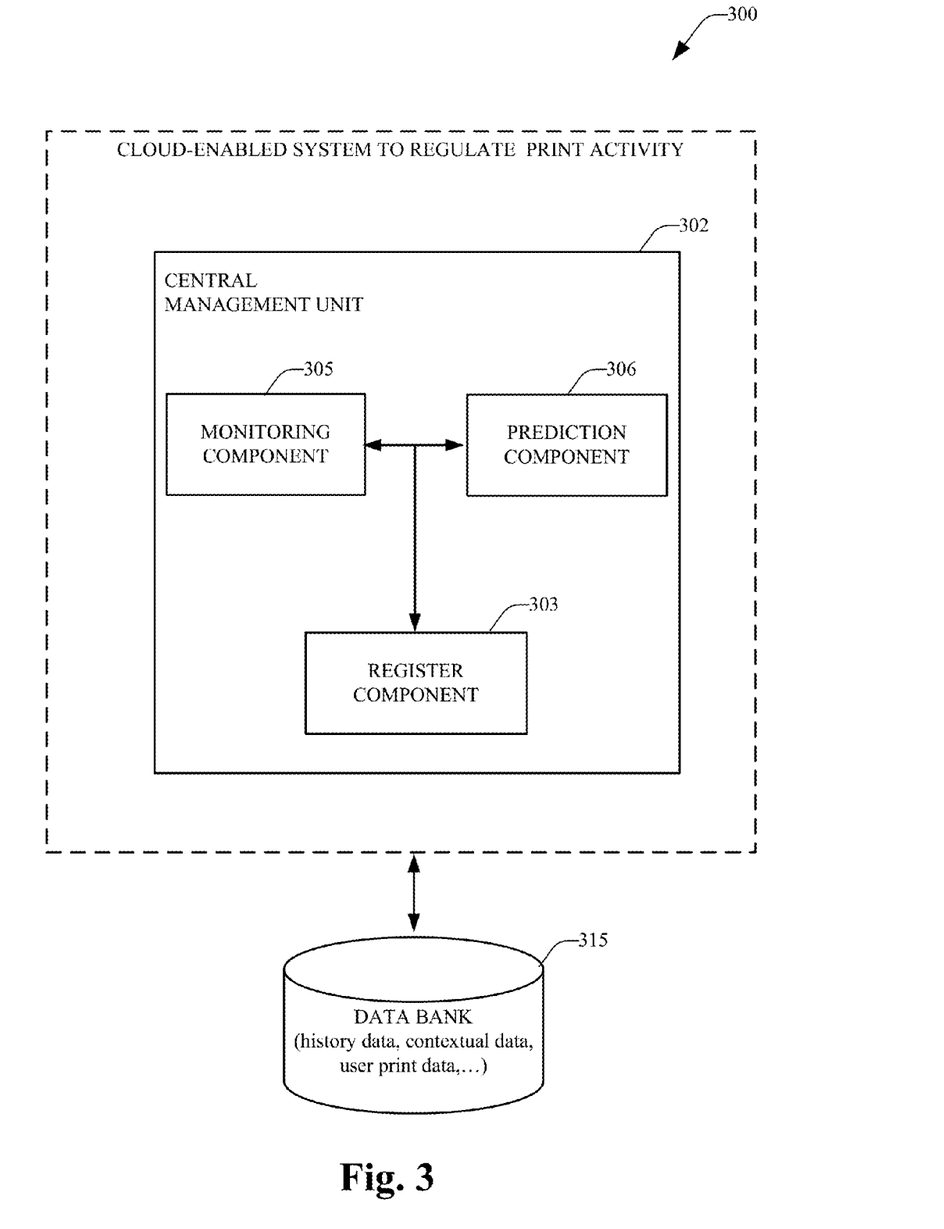
FIG. 3 illustrates a further example for a system of detecting and monitoring user print activity according to a further aspect of the subject disclosure.

FIG. 3 illustrates a central management unit 302 that further monitors user print activity and predicts printer supply requirements, according to a further aspect of the subject disclosure. The System 300 can include a register component 303 that can register a user regarding printing activities. Such register component 303 can set the type of account such as a "pre-paid" account or a "post-paid" account that a user is interested in. The system 300 can further employ a monitoring component 305 that can monitor printing activity of the device and its printing resources (such as ink levels, and the like.) The device activity can further be communicated to a prediction component 306 that can evaluate and/or predict when the device may require additional ink For example, the prediction of when additional ink is required can be based on factors such as printer model, character traits/behavior of user during printing activities, and the like.

In this regard, additional data that can further facilitate operation of the prediction component 306 can be supplied by data banks. Such data can include data mined by third parties—wherein various models such as: queuing models, Markov sources, probabilistic functions of Markov chains, and the like—can subsequently perform probabilistic predictions of ink usage/reordering is based upon the collected history. For example, if prior contacts exist with a customer/user—the subject innovation can model their specific behavior. Otherwise, a demographic model that represents the behavior modeled as an average of previous ink cartridge orders from similar individuals can be employed. In one aspect, the actual decision for which model to employ for user centric print activity, can initially be based on a weighted average of the specific and demographic information—and subsequently modified when sufficient data is accumulated on the specific behavior, to obtain its accurate model.

Moreover, different pieces of information, such as collected history for ink orders, feasibility/cost criteria for a contact center, probabilistic/stochastic models; operating instructions, and the like can also be maintained in the data bank 315. Such data bank 315 can further include storage systems having a complex model based database structure, wherein an item, a sub-item, a property, and a relationship can be defined to allow representation of information within a data storage system, for example. The data bank 315 can further employ a set of basic building blocks for creating and managing rich, persisted objects and links between objects—wherein an item can be defined as the smallest unit of consistency within the data storage system, which can be independently secured, serialized, synchronized, copied, backup/restored, for example.

As explained earlier, activities associated with print behaviors can be employed as a performance measure for a model that predicts and/or approximate ink and cartridge requirements based on mathematical analysis and/or stochastic procedures, by the prediction component 306.

By analyzing of the relevant queuing model, printer cartridge reordering scenarios can be identified and impact of proposed changes assessed. For example, different time periods for ordering ink supplies by various end user printing devices and/or users can be assigned various likelihood percentages. Specifically, training can occur through an $n^{th}$-order Markov model (where n is an integer) to probabilistically predict likelihood of ink depletion based on a short sequence of accumulated episodes of prior ink re-ordering behavior, for example. It is to be appreciated that any type of history that pertains to profiling character traits associated with ordering ink (e.g., demographic, psychographic; behavioral information such as: level of printing activity, age, gender, wealth index, interests, shopping habits, and the like) can be employed by the prediction component 306 as part of predicting ink depletion models for an end user.

The following discussion is an example for a Markov model that can be employed in conjunction with aspects disclosed herein. It is to be appreciated that such discussion serves as an example, and various deviations can occur from the particular model information. Prediction of ink depletion periods for a user or printer device can be based on its past history, wherein a model for sequence of ink depletion periods can be designated as $x_i$ wherein i represents a continuous time variable. It is further to be appreciated that if the model is further simplified, i can alternatively represent a discrete time variable. For example, considering an interval of t=3 month time frames from initial use of a printer or ink cartridge, wherein continuous time variables can be represented as $0 < x_1 \leq 3$ months, $3 < x_2 \leq 6$ months; $6 < x_3 \leq 9$ months, and the like. Such model can further be simplified by defining discrete time points with jump discontinuities from ink depletion, such as $x_1 = 3$ months; $x_2 = 6$ months; $x_3 = 9$ months; and the like.

Hence, $x_i$ can represent a time period after ink depletion for particular printer, and/or printer activity of a user, and $P[x_i]$ designates the likelihood of ink depletion and/or reordering ink during (or for) such time period. Accordingly, for each customer, whenever a prediction is performed, respective time/period evaluated for ink depletion can be denoted as $\{x_0, x_1, x_2, \ldots x_{max}\}$, where $x_0$ is the time at time of installing new ink cartridge, and $x_{max}$ represents a predefined time period for the contact center that the model no longer reorders ink cartridge, and instead implements other actions such as warning the end user. Hence, depending on whether the model employs a continuous probability distribution based on time as a continuous random variable, or alternatively, is simplified as a discrete probability distribution; the probability of reordering ink cartridge can be represented by: $P[x_i] = P[x_{i-1} < x \leq x_i]$—and predicted for; or during such time periods.

Based on such model, a probability distribution can be obtained wherein the horizontal axis represents discrete time points and the vertical axis is the likelihood of reordering ink cartridge and/or printer supplies. Associated histograms can be built, and subsequently normalized to obtain a discrete or continuous probability distribution. Moreover, various statistical values such as mean values and standard deviation can subsequently be computed. It is to be appreciated that parameters can further be defined based on second order models which can be sensitive to an additional element, such as particular channel information for an end user.

Figure 4:
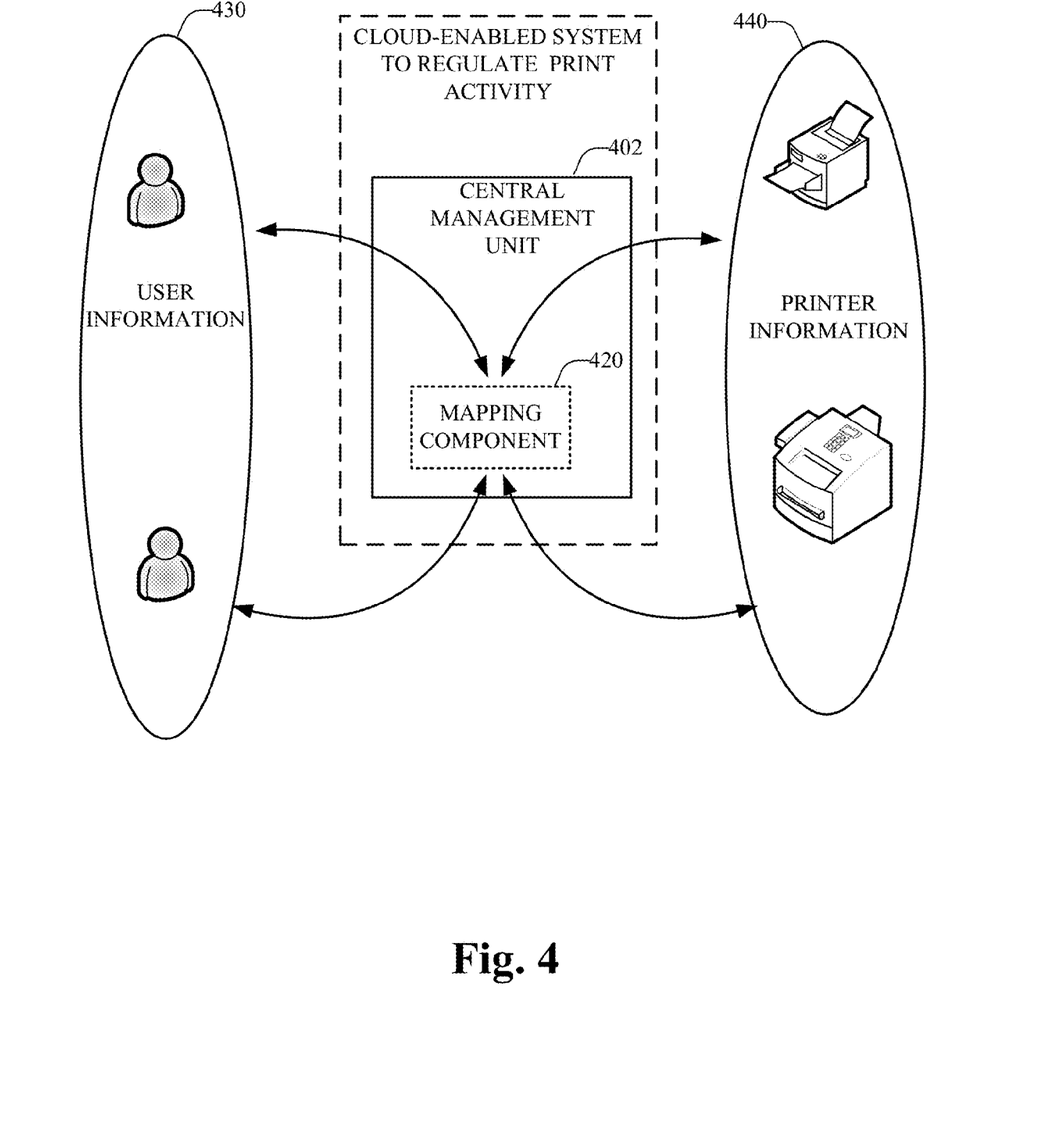
FIG. 4 illustrates a mapping component that maps information related to users to various printers and end user devices, according to a further aspect of the subject disclosure.

FIG. 4 illustrates a mapping component 420 as part of the central management unit 402 that maps information related to users to various printers and end user devices. In one particular aspect, such user type mapping can be provided by employing mapping user information 430 (e.g., prior ink orders, user location, contextual data, account type, and the like) stored in a database, to information associated with an end user device 440 (e.g., printer type, printer location, and the like.) It is to be appreciated that such mapping can be associated with any file storage system (e.g., a data model based on a system that utilizes complex instances of types to describe and/or represent a unit of information). For example representation for the type of account such as a "pre-paid" account or a "post-paid" account that a user is interested in can be stored as part of user profile. The user information data 430 and printer information 440 can interact with data storage systems (not shown) employing a set of basic building blocks for creating and managing rich, persisted objects and links between objects. An item can be defined as the smallest unit of consistency within the data storage system, which can be independently secured, serialized, synchronized, copied, backup/restored, and the like. Such item can include an instance of a type, wherein all items in the data storage system can be stored in a single global extent of items. Furthermore, the data storage system can be based upon at least one item and/or a container structure, and can act as a storage platform exposing rich metadata that is buried in files as items. The data storage system can include the database, to support the above discussed functionality, wherein any suitable characteristics and/or attributes can be implemented. Moreover, the data storage system can employ a container hierarchical structure, wherein a container is an item that can contain at least one other item. Such containment concept can be implemented via a container ID property inside the associated class, wherein the store can also be a container in form of a physical organizational and manageability unit. In addition, the store represents a root container for a tree of containers within the hierarchical structure.

Figure 5:
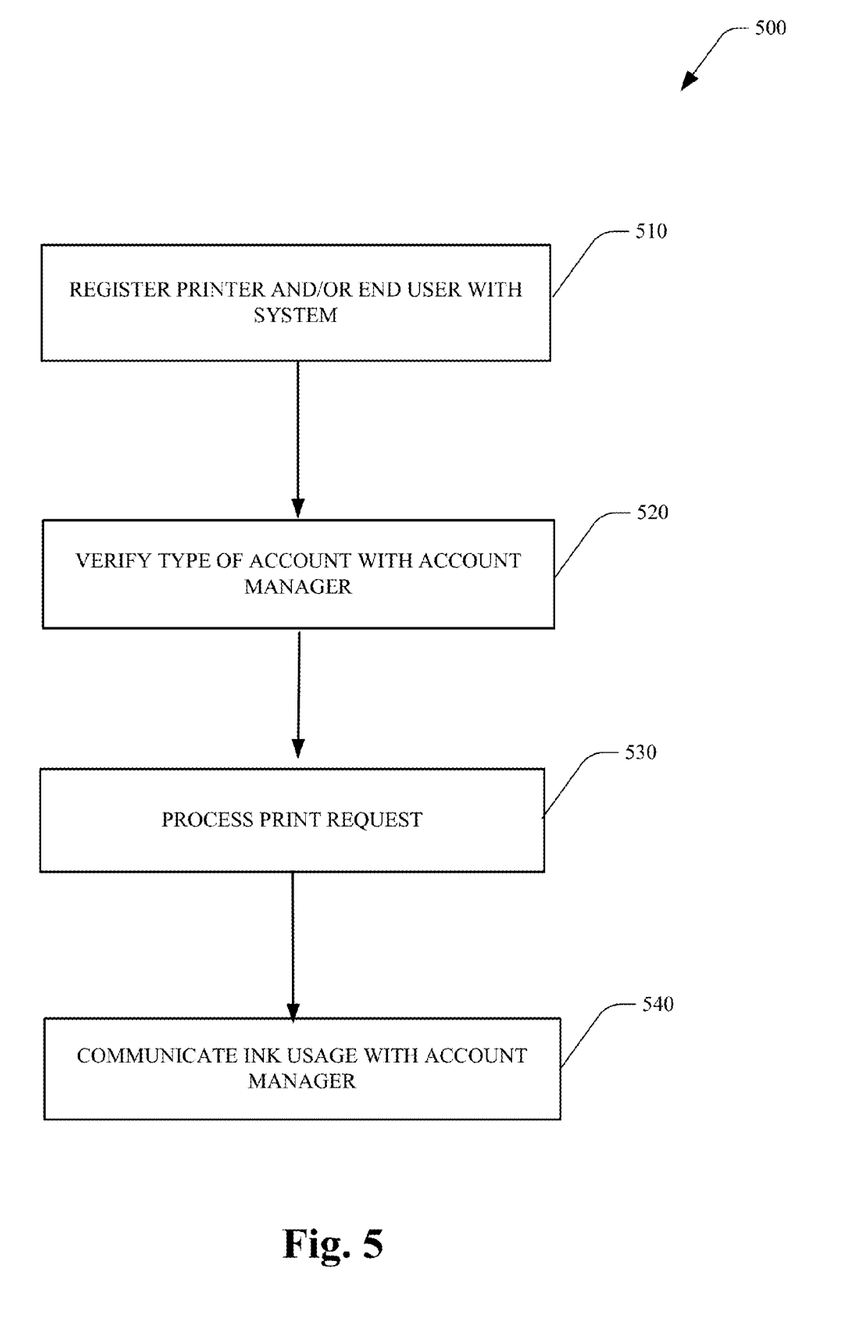
FIG. 5 illustrates a related methodology of regulating print usage according to a further aspect of the subject disclosure.

FIG. 5 illustrates a related methodology 500 for a web-enabled management of print usage according to a further aspect of the subject disclosure. While this exemplary method is illustrated and described herein as a series of blocks representative of various events and/or acts, the subject disclosure is not limited by the illustrated ordering of such blocks. For instance, some acts or events may occur in different orders and/or concurrently with other acts or events, apart from the ordering illustrated herein, in accordance with the subject disclosure. In addition, not all illustrated blocks, events or acts, may be required to implement a methodology in accordance with the subject disclosure. Moreover, it will be appreciated that the exemplary method and other methods according to the disclosure may be implemented in association with the method illustrated and described herein, as well as in association with other systems and apparatus not illustrated or described. Initially and at 510, an end user device such as a web-enabled printer can be registered with the system. For example, the web-enabled printer can be registered with a central management unit as described earlier, wherein the user can subsequently submit a request for print to such web-enabled printer. It is to be appreciated that such request can be performed by employing various devices, such as hand held mobile phones (e.g., dedicated applications for print activities), laptops, computers, portable processing units, landlines and the like.

Subsequently and at 520, an account manager associated with the system (e.g., as part of the central management unit) can be contacted to verify type of account that the user has registered for print activities. For example, if a prepaid account exists, then the system can validate if the user has sufficient funds available to print the document.

In a related example, if a postpaid account exists then the job can be directly submitted for processing. As such and at 530, the print request can be processed and printed on the web-enabled printer (e.g., which is mapped to the user.) At 540, ink usage details employed for such task can then be communicated with the account manager and suitable adjustments made to the user account.

Figure 6:
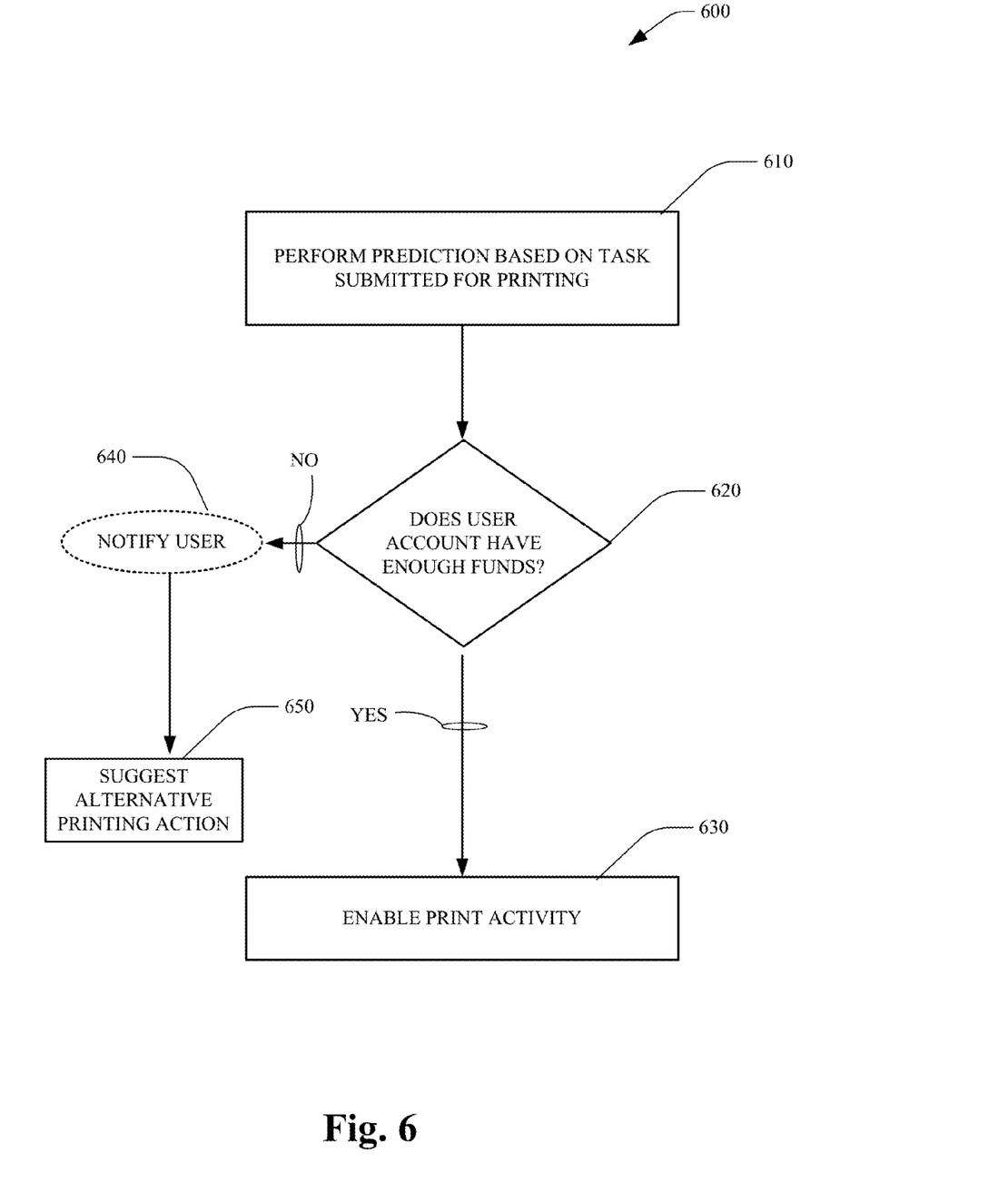
FIG. 6 illustrates an example of a methodology for managing user accounts as part of an aspect of the subject disclosure.

FIG. 6 illustrates a related methodology 600 of managing user accounts as part of a particular aspect of subject disclosure. Initially and at 610, the user can submit a job for printing, wherein a prediction can be performed as described in detail earlier in the subject disclosure (e.g., based on historical data), to predict amount of ink used and/or fees the user can be charged for such print activity. Based on such prediction and at 620, an estimate is performed about whether current funds user account can sustain such print activity. If so, the methodology proceeds to act 630 wherein the request for print activity is enabled. Otherwise and if not, at 640 the user is notified about lack of funds and update. For example, if $1 remains available in the users credit, and the user has submitted a rich Image document which will be estimated by the system to cost $5, then the system will reject such print, and instead suggest alternative printing action at 650, such as recommending to such user the type of document that can be printed with available funds.

Figure 7:
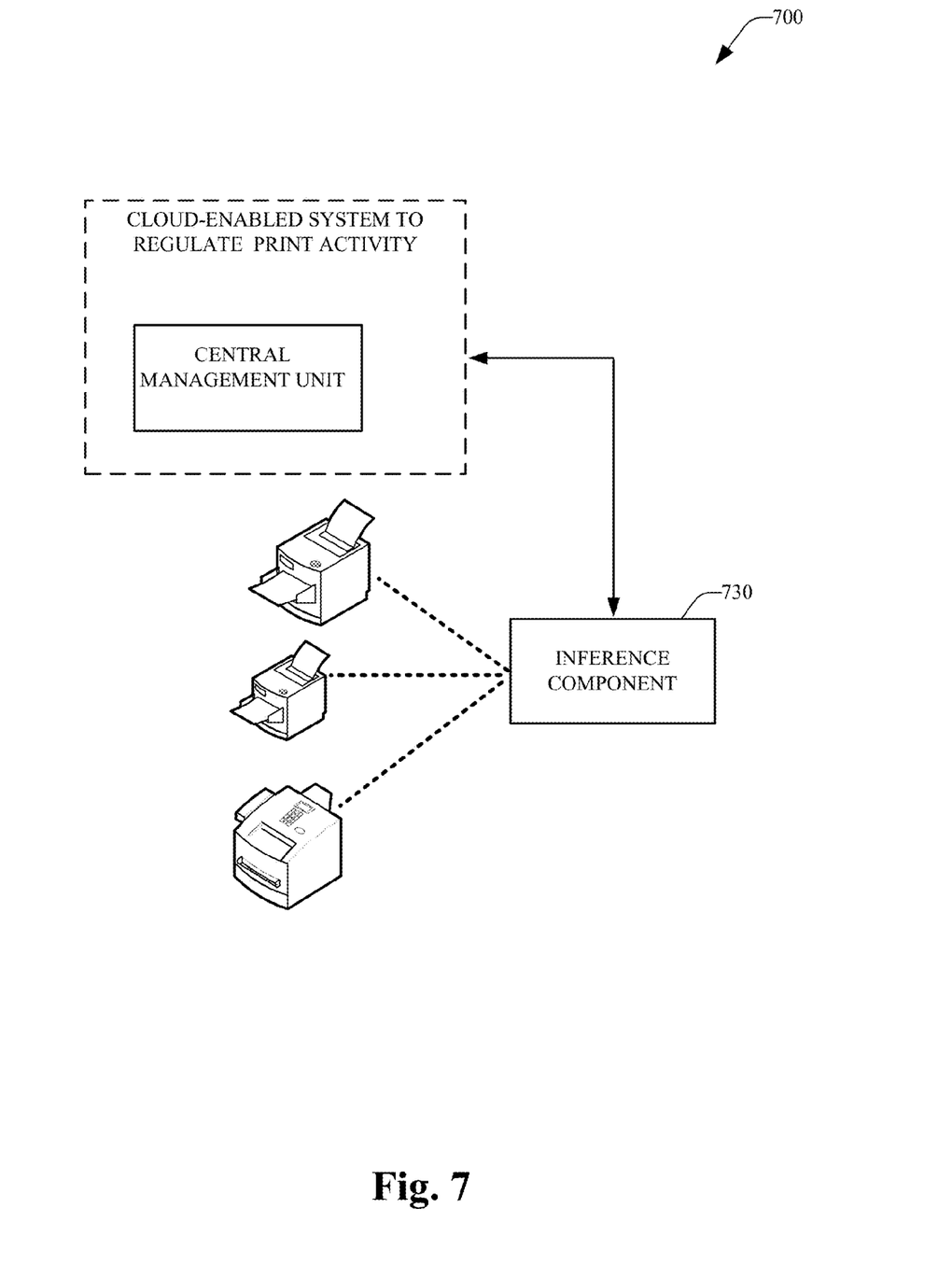
FIG. 7 illustrates an inference component that can facilitate inferring and/or determining when, where, how to predict printer ink usage.

FIG. 7 illustrates an inference component 730 (e.g., an artificial intelligence—AI) that can facilitate inferring and/or determining when, where, how to predict printer ink usage and/or train models that employ user centric approaches for managing/regulating ink replacement in accordance with an aspect of the subject disclosure. As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The system 700 with inference component 730 can employ any of a variety of suitable AI-based schemes as described supra in connection with facilitating various aspects of the herein described disclosure. For example, a process for learning explicitly or implicitly how parameters are to be created for training models based on escalations of contact can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject disclosure can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's can be configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Exemplary Networked and Distributed Environments

It is to be appreciated that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
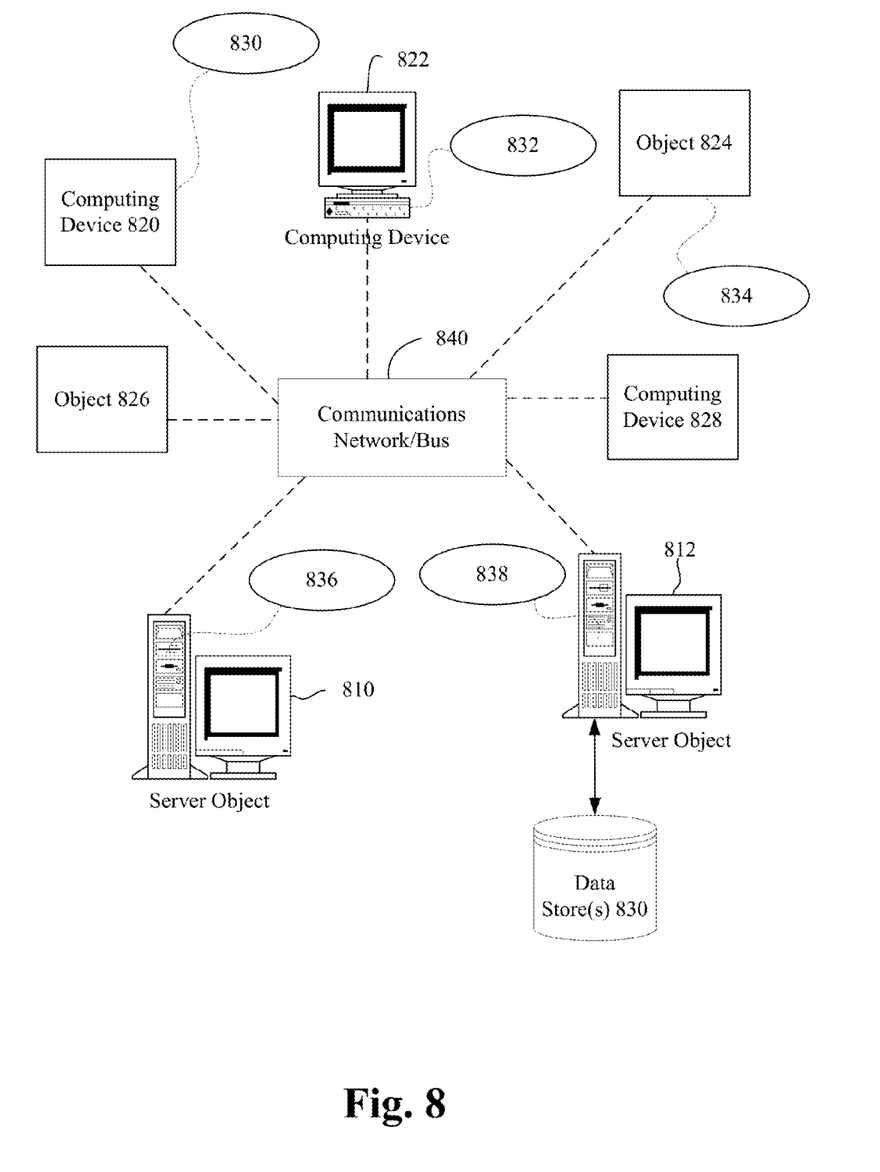
FIG. 8 provides a schematic diagram for a networked or distributed computing environment in which embodiments described herein can be implemented.

FIG. 8 provides a schematic diagram of an exemplary networked or distributed computing environment 800 in which embodiments described herein can be implemented. The distributed computing environment includes computing objects 810, 812, etc. and computing objects or devices 820, 822, 824, 826, 828, etc., which can include programs, methods, data stores, programmable logic, etc., as represented by applications 830, 832, 834, 836, 838. It is to be appreciated that computing objects 810, 812, etc. and computing objects or devices 820, 822, 824, 826, 828, etc. can include different devices, such as personal digital assistants (PDAs), audio/video devices, mobile phones, MPEG-1 Audio Layer 3 (MP3) players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 can include other computing objects and computing devices that provide services to the system of FIG. 8, and/or can represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an application programming interface (API), or other object, software, firmware and/or hardware, suitable for communication with or implementation of the various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices can process data, or request transaction services or tasks that can implicate the techniques for systems as described herein for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 can be the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Computing objects 810, 812, etc. can also serve as client computing objects or devices 820, 822, 824, 826, 828, etc., as can be characteristic of a distributed computing environment.

Exemplary Computing Device

Figure 9:
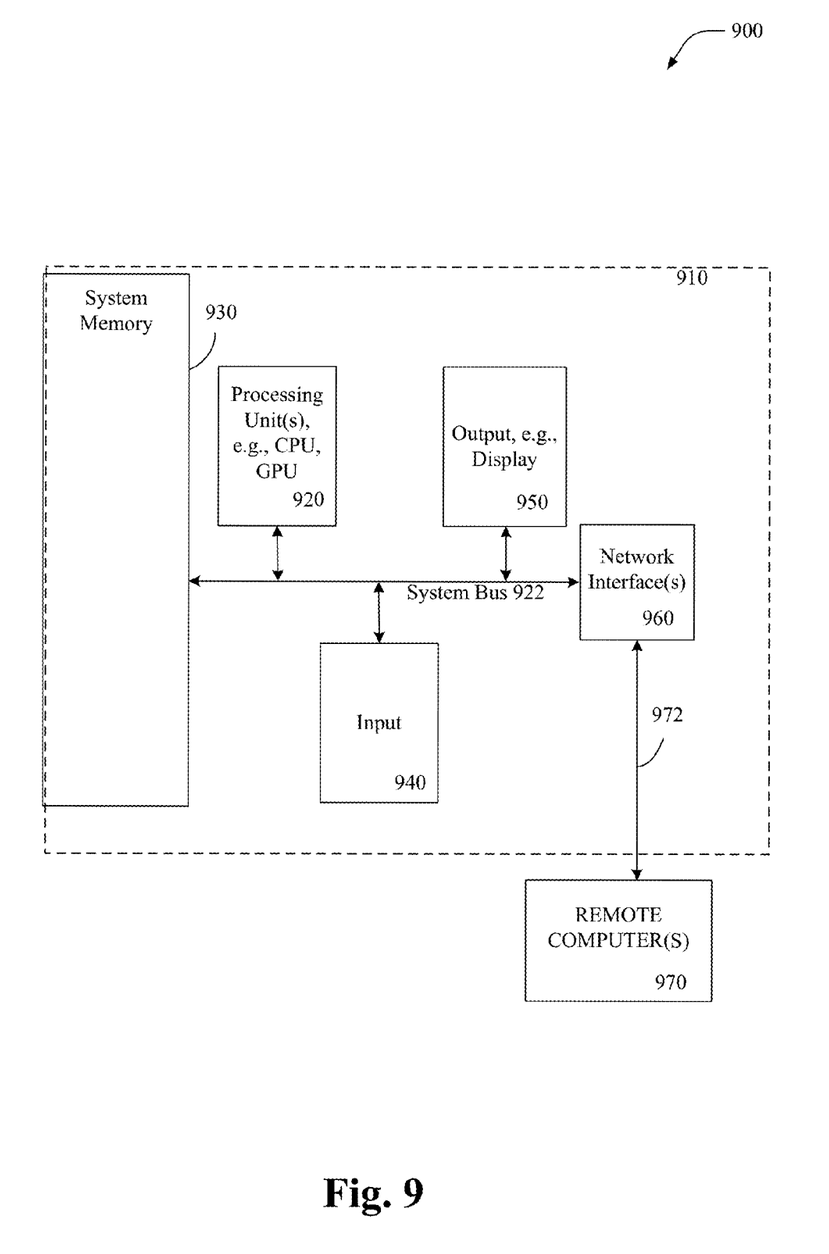
FIG. 9 illustrates an example of a suitable computing environment in which one or aspects of the embodiments described herein can be implemented.

As mentioned, advantageously, the techniques described herein can be applied to any suitable device. It is to be understood, therefore, that handheld, portable and other computing devices and computing objects of all kinds are contemplated for use in connection with the various embodiments, e.g., anywhere that a device may wish to read or write transactions from or to a data store. Accordingly, the below remote computer described below in FIG. 9 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described herein. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing environment 900 in which one or aspects of the embodiments described herein can be implemented, although as made clear above, the computing environment 900 is only one example of a suitable computing environment and is not intended to suggest any limitation as to scope of use or functionality. Neither is the computing environment 900 to be interpreted as having any dependency or requirement relating to any one or combination of components illustrated in the exemplary computing environment 900.

With reference to FIG. 9, an exemplary computing environment 900 for implementing one or more embodiments includes a computing device in the form of a computer 910 is provided. Components of computer 910 can include, but are not limited to, a processing unit 920, a memory 930, and a system bus 922 that couples various system components including the system memory to the processing unit 920. Computer 910 can for example implement systems and/or components described in connection with various aspect of the subject disclosure.

Computer 910 typically includes a variety of computer readable media and can be any available media that can be accessed by computer 910. The memory 930 can include computer storage media in the form of volatile and/or non-volatile memory such as read only memory (ROM) and/or random access memory (RAM). By way of example, and not limitation, memory 930 can also include an operating system, application programs, other program modules, and program data.

A user can enter commands and information into the computer 910 through input devices 940, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 910. A monitor or other type of display device can be also connected to the system bus 922 via an interface, such as output interface 950. In addition to a monitor, computers can also include other peripheral output devices such as speakers and a printer, which can be connected through output interface 950.

The computer 910 can operate in a networked or distributed environment using logical connections to one or more other remote computers, such as remote computer 970. The remote computer 970 can be a personal computer, a server, a router, a network PC, a peer device or other common network node, or any other remote media consumption or transmission device, and can include any or all of the elements described above relative to the computer 910. The logical connections depicted in FIG. 9 include a network 972, such local area network (LAN) or a wide area network (WAN), but can also include other networks/buses e.g., cellular networks.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessor and/or other electronic units designed to perform the functions described herein, or a combination thereof.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules or components (e.g., procedures, functions, and so on) that perform the functions described herein. The software codes can be stored in memory units and executed by processors.

A memory unit can be implemented within the processor or external to the processor, in which case it can be communicatively coupled to the processor via various structures.

Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein can also interact with one or more other components not specifically described herein but generally known by those of skill in the art.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. The subject disclosure is not to be limited to any single embodiment, but rather can be construed in breadth, spirit and scope in accordance with the appended claims.

What is claimed is:

1. A non-transitory computer readable medium comprising machine readable instructions for facilitating print activities, the machine readable instructions, when executed by a processor, cause the processor to:
   maintain an account associated with user print activities of printers for an end-user;
   service requests related to management of print supplies for the account;
   determine a prediction model based upon end-user characteristic traits associated with ordering print supplies, the end-user character traits including at least one of demographic and psychographic information pertaining to the end-user; and predict the print supplies required by the user print activities of the end-user based on the determined prediction model.

2. The non-transitory computer readable medium of claim 1, wherein the account is at least one of a prepaid account or a postpaid account.

3. The non-transitory computer readable medium of claim 1, wherein the print supplies include printer ink.

4. The non-transitory computer readable medium of claim 1, wherein the machine readable instructions are to further cause the processor to monitor the print supplies based on the user print activities.

5. The non-transitory computer readable medium of claim 1, wherein the machine readable instructions are associated with receipt of payment from the end-user.

6. The non-transitory computer readable medium of claim 1, wherein the machine readable instructions are to further cause the processor to infer likelihood of ink depletion.

7. The non-transitory computer readable medium of claim 1, wherein the machine readable instructions are to further cause the processor to map the end-user with printers.

8. The non-transitory computer readable medium of claim 1, wherein the machine readable instructions are to cause the processor to validate the printers and authorize the user print activity.

9. The non-transitory computer readable medium of claim 1, wherein the machine readable instructions are to further cause the processor to:
determine, based upon the prediction, whether the account will sustain the print activities of the end-user; and
suggest an alternate print activity based upon the prediction in response to a determination that the account will not sustain the print activities of the end-user.

10. A method comprising:
registering at least one of a printer and an end-user with a central management unit, to create one of a postpaid or a pre-paid account;
determining, by a prediction component associated with the central management unit, a prediction model based upon end-user characteristic traits associated with ordering print supplies, the end-user character traits including at least one of demographic and psychographic information pertaining to the end-user;
predicting, by the prediction component, ink usage based on the determined prediction model; and
servicing print requests of the at least one of the printer and the end-user based upon the predicted ink usage.

11. The method of claim 10 further comprising real time monitoring of prints supplies associated with the printer.

12. The method of claim 10 further comprising inferring likelihood of ink depletion for the printer.

13. The method of claim 10 further comprising mapping end-users with printers.

14. The method of claim 10, wherein the predicting further includes training models of regulating ink replacements.

15. The method of claim 10 further comprising verifying type of account associated with the end-user.

16. The method of claim 10, further comprising:
determining, based on the predicting, whether the account will sustain the print requests; and
suggesting an alternate servicing of the print request in response to a determination that the account will not sustain the print requests.

17. A system to facilitate print activities, comprising:
a central management unit to analyze print activities of an end-user, to regulate service requests of print supplies, and to maintain an account for the end-user;
a prediction component to:
determine a prediction model based upon end-user characteristic traits associated with ordering print supplies, the end-user character traits including at least one of demographic and psychographic information pertaining to the end-user; and
predict ink usage associated with the print activities of the end-user based on the determined prediction model; and
a registration component to register the end-user based on the service requests of print supplies.

18. The system of claim 17, wherein the prediction component is further to:
determine, based on the prediction, whether the account will sustain the predicted ink usage, and
suggest alternate print activities in response to a determination that the account will not sustain the predicted ink usage.

* * * * *